United States Patent
Lin et al.

(10) Patent No.: US 9,258,088 B2
(45) Date of Patent: Feb. 9, 2016

(54) METHOD OF PERFORMING BUFFER STATUS REPORTING AND COMMUNICATION DEVICE THEREOF

(75) Inventors: Shiang-Jiun Lin, New Taipei (TW); Chun-Chia Chen, New Taipei (TW); Tzu-Ming Lin, New Taipei (TW); Chun-Yen Wang, New Taipei (TW)

(73) Assignee: ACER INCORPORATED, Xizhi Dist., New Taipei (TW)

( * ) Notice: Subject to any disclaimer, the term of this patent is extended or adjusted under 35 U.S.C. 154(b) by 1190 days.

(21) Appl. No.: 13/163,719

(22) Filed: Jun. 19, 2011

(65) Prior Publication Data
US 2011/0310937 A1  Dec. 22, 2011

Related U.S. Application Data

(60) Provisional application No. 61/356,237, filed on Jun. 18, 2010.

(51) Int. Cl.
*H04W 28/02* (2009.01)
*H04L 5/00* (2006.01)
*H04W 72/12* (2009.01)
*H04W 74/00* (2009.01)

(52) U.S. Cl.
CPC ........... *H04L 5/001* (2013.01); *H04W 28/0278* (2013.01); *H04L 5/0023* (2013.01); *H04L 5/0098* (2013.01); *H04W 72/1284* (2013.01); *H04W 74/004* (2013.01)

(58) Field of Classification Search
CPC .............. H04W 28/0278; H04W 72/1284; H04W 74/004; H04L 5/001; H04L 5/0023; H04L 5/0098
See application file for complete search history.

(56) References Cited

U.S. PATENT DOCUMENTS

| | | | |
|---|---|---|---|
| 2008/0064410 A1 | 3/2008 | Kwon | |
| 2009/0175229 A1* | 7/2009 | Tseng | H04W 28/065 370/329 |
| 2009/0219951 A1* | 9/2009 | Chun et al. | 370/474 |
| 2009/0232018 A1* | 9/2009 | Chun et al. | 370/252 |
| 2009/0285104 A1* | 11/2009 | Tseng | H04W 72/1284 370/241 |
| 2010/0085926 A1 | 4/2010 | Harada | |
| 2010/0118720 A1 | 5/2010 | Gauvreau | |
| 2011/0242972 A1 | 10/2011 | Sebire | |
| 2012/0057547 A1* | 3/2012 | Lohr et al. | 370/329 |

FOREIGN PATENT DOCUMENTS

CN  101547435 A  9/2009

OTHER PUBLICATIONS

Nokia Siemens Networks, Nokia Corporation: "BSR for Carrier Aggregation", 3GPP TSG-RAN WG2 Meeting #69bis, R2-102164, Apr. 12-16, 2010, Beijing, China, XP050422579.

(Continued)

*Primary Examiner* — Parth Patel
*Assistant Examiner* — Kai Chang
(74) *Attorney, Agent, or Firm* — Winston Hsu; Scott Margo

(57) ABSTRACT

A method of performing buffer status reporting for a mobile device capable of UL MIMO and/or capable of receiving and transmitting on a plurality of component carriers in a wireless communication system is disclosed. The method comprises generating at least a MAC subheader, generating at least two MAC control elements for jointly indicating buffer status of at least a logical channel group in the mobile device, and generating a MAC PDU including the at least a MAC subheader and the at least two MAC control elements for the buffer status reporting.

14 Claims, 15 Drawing Sheets

(56) References Cited

OTHER PUBLICATIONS

Alcatel-Lucent Shanghai Bell, Alcatel-Lucent: "BSR reporting in Carrier Aggregation", 3GPP TSG-RAN WG2 Meeting #70, R2-103277, May 10-14, 2010, pp. 1-4, Montreal, Canada, XP050423430.

Nokia Siemens Networks, Nokia Corporation: "BSR for Carrier Aggregation", 3GPP TSG-RAN WG2 Meeting #70, R2-102805, May 10-14, 2010, Montreal, Canada, XP050423147.

* cited by examiner

| Index | Buffer size(BS) value [bytes] | Index | Buffer size(BS) value [bytes] |
|---|---|---|---|
| 0 | BS=0 | 32 | 1132<BS≦1326 |
| 1 | 0<BS≦10 | 33 | 1326<BS≦1552 |
| 2 | 10<BS≦12 | 34 | 1552<BS≦1817 |
| 3 | 12<BS≦14 | 35 | 1817<BS≦2127 |
| 4 | 14<BS≦17 | 36 | 2127<BS≦2490 |
| 5 | 17<BS≦19 | 37 | 2490<BS≦2915 |
| 6 | 19<BS≦22 | 38 | 2915<BS≦3413 |
| 7 | 22<BS≦26 | 39 | 3413<BS≦3995 |
| 8 | 26<BS≦31 | 40 | 3995<BS≦4677 |
| 9 | 31<BS≦36 | 41 | 4677<BS≦5476 |
| 10 | 36<BS≦42 | 42 | 5476<BS≦6411 |
| 11 | 42<BS≦49 | 43 | 6411<BS≦7505 |
| 12 | 49<BS≦57 | 44 | 7505<BS≦8787 |
| 13 | 57<BS≦67 | 45 | 8787<BS≦10287 |
| 14 | 67<BS≦78 | 46 | 10287<BS≦12043 |
| 15 | 78<BS≦91 | 47 | 12043<BS≦14099 |
| 16 | 91<BS≦107 | 48 | 14099<BS≦16507 |
| 17 | 107<BS≦125 | 49 | 16507<BS≦19325 |
| 18 | 125<BS≦146 | 50 | 19325<BS≦22624 |
| 19 | 146<BS≦171 | 51 | 22624<BS≦26487 |
| 20 | 171<BS≦200 | 52 | 26487<BS≦31009 |
| 21 | 200<BS≦234 | 53 | 31009<BS≦36304 |
| 22 | 234<BS≦274 | 54 | 36304<BS≦42502 |
| 23 | 274<BS≦321 | 55 | 42502<BS≦49759 |
| 24 | 321<BS≦376 | 56 | 49759<BS≦58255 |
| 25 | 376<BS≦440 | 57 | 58255<BS≦68201 |
| 26 | 440<BS≦515 | 58 | 68201<BS≦79846 |
| 27 | 515<BS≦603 | 59 | 79846<BS≦93479 |
| 28 | 603<BS≦706 | 60 | 93479<BS≦100439 |
| 29 | 706<BS≦826 | 61 | 109439<BS≦128125 |
| 30 | 826<BS≦967 | 62 | 128125<BS≦150000 |
| 31 | 967<BS≦1132 | 63 | BS>150000 |

FIG. 1 PRIOR ART

METHOD OF PERFORMING BUFFER STATUS REPORTING AND COMMUNICATION DEVICE THEREOF

CROSS REFERENCE TO RELATED APPLICATIONS

This application claims the benefit of U.S. Provisional Application No. 61/356,237, filed on Jun. 18, 2010 and entitled "Methods and Systems for Buffer Status Report" the contents of which are incorporated herein in their entirety.

BACKGROUND OF THE INVENTION

1. Field of the Invention

The application relates to a method utilized in a wireless communication system and a communication device thereof, and more particularly, to a method of performing buffer status reporting in a wireless communication system and a related communication device.

2. Description of the Prior Art

Long Term Evolution wireless communication system (LTE system), an advanced high-speed wireless communication system established upon the 3G mobile telecommunication system, supports only packet-switched transmission, and tends to implement both Medium Access Control (MAC) layer and Radio Link Control (RLC) layer in one single communication site, such as in Node B (NB) alone rather than in NB and RNC (Radio Network Controller) respectively, so that the system structure becomes simple.

In LTE, MAC provides transmission services via a plurality of logic channels. To manage uplink resources, when a user equipment (UE) performs uplink transmission, the network can divide or map logical channels of the UE into at most four groups based on priorities, types, QoS and so on. The 3rd Generation Partnership Project, 3GPP, introduces a buffer status reporting (BSR) procedure, which is used to provide the network with information about an amount of data in at least an uplink buffer (hereafter called a buffer size) of the UE.

In the BSR procedure, UE uses a MAC PDU (Protocol Data Unit) to carry a BSR MAC control element for reporting buffer size of one or four logical channel groups of the UE. Accordingly, the network can determine the total amount of data available across one or four logical channel groups, so as to allocate uplink resource to the UE for data transmission. According to different requirements, BSR MAC control element can be categorized into two formats: short and long formats. A short BSR MAC control element is 1-byte long, and has 8 bits, where the former 2 bits (called a logical channel group identity (LCG ID) field) indicate one logical channel group which buffer status is being reported, and the remaining 6 bits (called an index field) indicate an index value. A long BSR control element is three-byte long, and has four index fields indicating four index values at a time.

More specifically, please refer to FIG. 1, which is a schematic diagram of a buffer size table according to the prior art. According to the buffer size table, each index value (e.g. index='0'-'63') corresponds to a buffer size value (e.g. from 0 to 150000 byte) in byte. For example, the index='0' corresponds to BS=0, the index='1' corresponds to 0<BS<=10, and so on. Thus, when the network receives the MAC PDU including the BRS MAC control element, the network knows the buffer status of the logical channel group according to the index value in the index field of the BSR MAC control element and the buffer size table, so as to allocate sufficient resource to the UE.

Moreover, the MAC PDU carries a MAC header consisting of at least a MAC subheader. The MAC subheader corresponding to the BSR MAC control element generally consists of two Reserved bits, an 1-bit Extension field and a 5-bit logic channel identity (LCID) field. In the current specification, the format (e.g. the short BSR MAC control element or long BSR MAC control element) of the BSR MAC control element can be identified by a LCID value in the LCID field.

A long term evolution-advanced (LTE-A) system, as its name implies, is an evolution of the LTE system. The LTE-A system targets faster switching between power states, improves performance at a cell edge, and includes subjects, such as bandwidth extension, coordinated multipoint transmission/reception (CoMP), UL multiple-input multiple-output (MIMO), etc.

For bandwidth extension, carrier aggregation is introduced to the LTE-Advanced system for extension to wider bandwidth, where two or more component carriers are aggregated, for supporting wider transmission bandwidths (for example up to 100 MHz) and for spectrum aggregation. According to carrier aggregation capability, multiple component carriers are aggregated into overall wider bandwidth, where the UE can establish multiple links corresponding to the multiple component carriers for simultaneously receiving and/or transmitting.

In the LTE system, the buffer size table of FIG. 1 is defined for the UE supporting a single component carrier. For the UE supporting only one component carrier, the maximum buffer size value (e.g. 150000 bytes) corresponding to the maximum index value (e.g. index='63') is sufficient for buffer status reporting. However, in the LTE-Advanced system, the UE is allowed to transmit/receive data on multiple component carriers to increase the data rate. Thus, the maximum buffer size value is not enough for buffer status reporting in multiple component carriers, causing the network allocates insufficient resource to the UE for data transmission. For example, there is 200000 bytes in an uplink buffer for transmission. The UE sends a MAC PDU including a BSR MAC control element to the network (i.e. an eNB) for buffer status reporting. However, the BSR MAC control element indicates index='63' to the eNB, and thereby the eNB may think there is only 150000 bytes for uplink transmission. Thus, the eNB may allocate insufficient resource to the UE.

In addition, an extended buffer size table (e.g. 8-bit, or 10-bit buffer size table) may be introduced in the LTE-Advanced system, for extending the buffer size indication range (e.g. up to 3000000 bytes). However, how to performing buffer status reporting is never concerted. In other word, how the MAC PDU for buffer status reporting is not clearly defined. For example, due to the conventional format of the BSR MAC control element (e.g. only 6 bits for index value indication), the index value indicated by the BSR MAC control element is up to index='63'. In a word, even though there is an index value in the extended buffer size table larger than index='63', the current BSR MAC control element is unable to indicate the extended index value (e.g. index='255' with 8-bit buffer size table) or extended buffer size value (e.g. 3000000 bytes).

SUMMARY OF THE INVENTION

The application discloses a method of performing buffer status reporting in a wireless communication system and a related communication device in order to solve the above-mentioned problem.

A method of performing buffer status reporting for a mobile device capable of UL MIMO and/or capable of receiving and transmitting on a plurality of component carriers in a wireless communication system is disclosed. The method comprises generating at least a MAC subheader, generating at least two MAC control elements for jointly indicating buffer status of at least a logical channel group in the mobile device, and generating a MAC PDU including the at least a MAC subheader and the at least two MAC control elements for the buffer status reporting.

A method of performing buffer status reporting for a mobile device capable of UL MIMO and/or capable of receiving and transmitting on a plurality of component carriers in a wireless communication system is disclosed. The method comprises generating a MAC subheader, generating a MAC control element including at least a index field each for indicating a buffer size of a logical channel group in the mobile device and at least a extension field each corresponding to the at least a index field for extending a index value in the index field or extending the buffer size, and generating a MAC PDU including the MAC subheader and the MAC control element, for the buffer status reporting.

A method of performing buffer status reporting for a mobile device capable of UL MIMO and/or capable of receiving and transmitting on a plurality of component carriers in a wireless communication system is disclosed. The method comprises generating at least a MAC subheader, generating a first MAC control element including at least a index field each for indicating a buffer size of a logical channel group in the mobile device and at least a second MAC control element each including at least a extension field corresponding to the at least a index field for extending index values in the index fields or extending the buffer sizes, and generating a MAC PDU including the first MAC subheader and the at least a second MAC control element, for the buffer status reporting.

A communication device of a wireless communication system for performing buffer status reporting is disclosed. The communication device is capable of UL MIMO and/or capable of receiving and/or transmitting on a plurality of component carriers and comprises means for generating at least a MAC subheader, means for generating at least two MAC control elements for jointly indicating buffer status of at least a logical channel group in the mobile device, and means for generating a MAC PDU including the at least a MAC subheader and the at least two MAC control elements for the buffer status reporting.

A communication device of a wireless communication system for performing buffer status reporting is disclosed. The communication device is capable of UL MIMO and/or capable of receiving and/or transmitting on a plurality of component carriers and comprises means for generating a MAC subheader, means for generating a MAC control element including at least a index field each for indicating a buffer size of a logical channel group in the mobile device and at least a extension field each corresponding to at least a index field for extending index values in the index fields or extending the buffer size, and means for generating a MAC PDU including the MAC subheader and the MAC control element, for the buffer status reporting.

A communication device of a wireless communication system for performing buffer status reporting is disclosed. The communication device is capable of UL MIMO and/or capable of receiving and/or transmitting on a plurality of component carriers and comprises means for generating at least a MAC subheader, means for generating a first MAC control element including at least a index field each for indicating a buffer size of a logical channel group in the mobile device and at least a second MAC control element each including at least a extension field corresponding to the at least a index field for extending index values in the index fields or extending the buffer sizes, and means for generating a MAC PDU including the first MAC subheader and the at least a second MAC control element, for the buffer status reporting.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 1 illustrates a schematic diagram of a buffer size table according the prior art.

DETAILED DESCRIPTION

Figure 2:
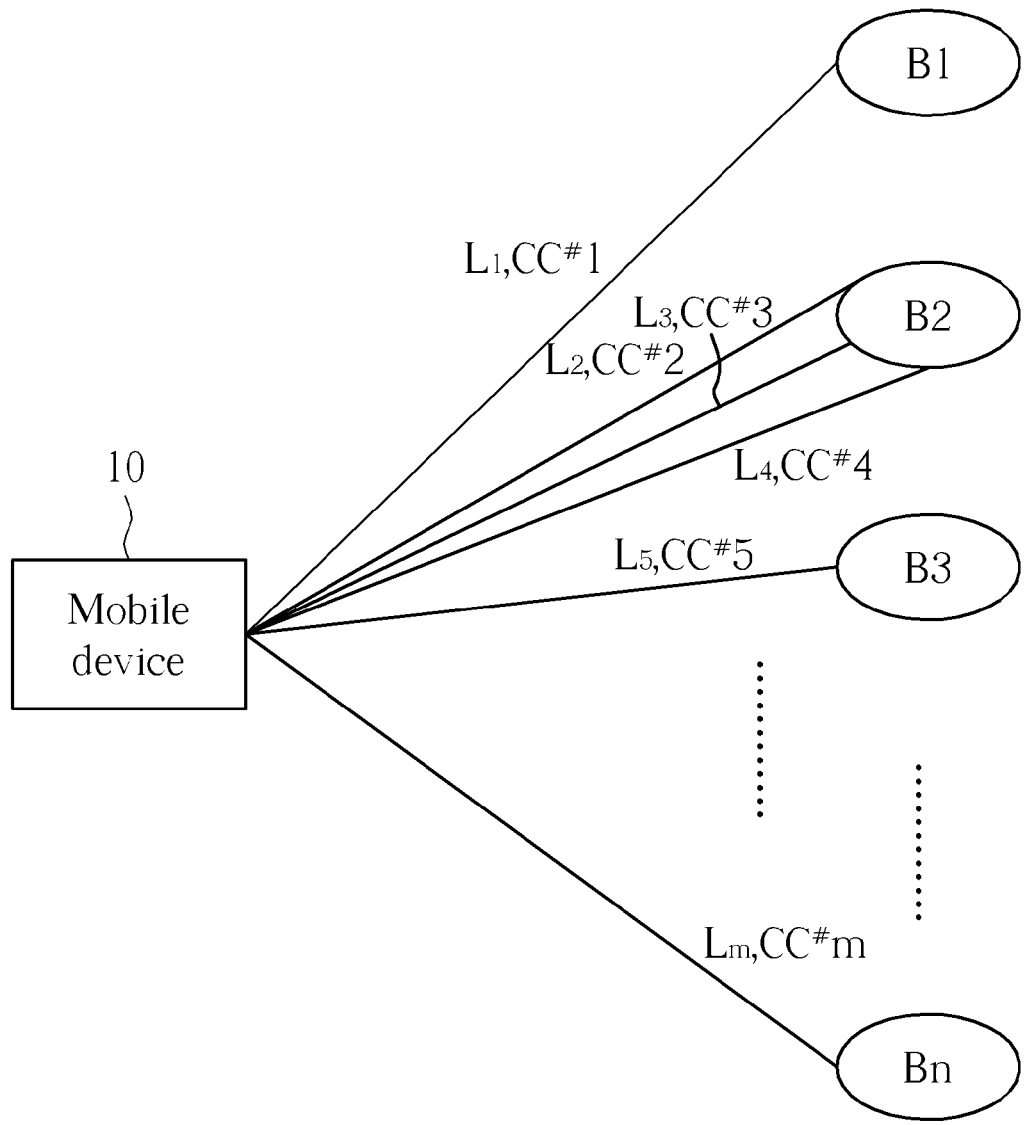
FIG. 2 illustrates a schematic diagram of an exemplary wireless communication system.

Please refer to FIG. 2, which illustrates a schematic diagram of a wireless communication system featuring multiple connections between a mobile device 10 and base stations B1-Bn. The wireless communication system may be a LTE-Advanced system (i.e. an evolved universal terrestrial radio access network (E-UTRAN)) or any other similar network system. The mobile device 10 can operate with carrier aggregation. In FIG. 2, the mobile device 10 communicates with the base stations B1-Bn through radio links $L_1$-$L_m$ that correspond to component carriers cc#1-cc#m configured in the mobile device 10 respectively. Each of the component carriers cc#1-cc#m corresponds to a radio frequency (RF) channel whose bandwidth may be varied according to different communication systems. In addition, the mobile device 10 is referred as a user equipment (UE) or a mobile station (MS), and can be a device such as a mobile phone, a computer system, etc.

Figure 3:
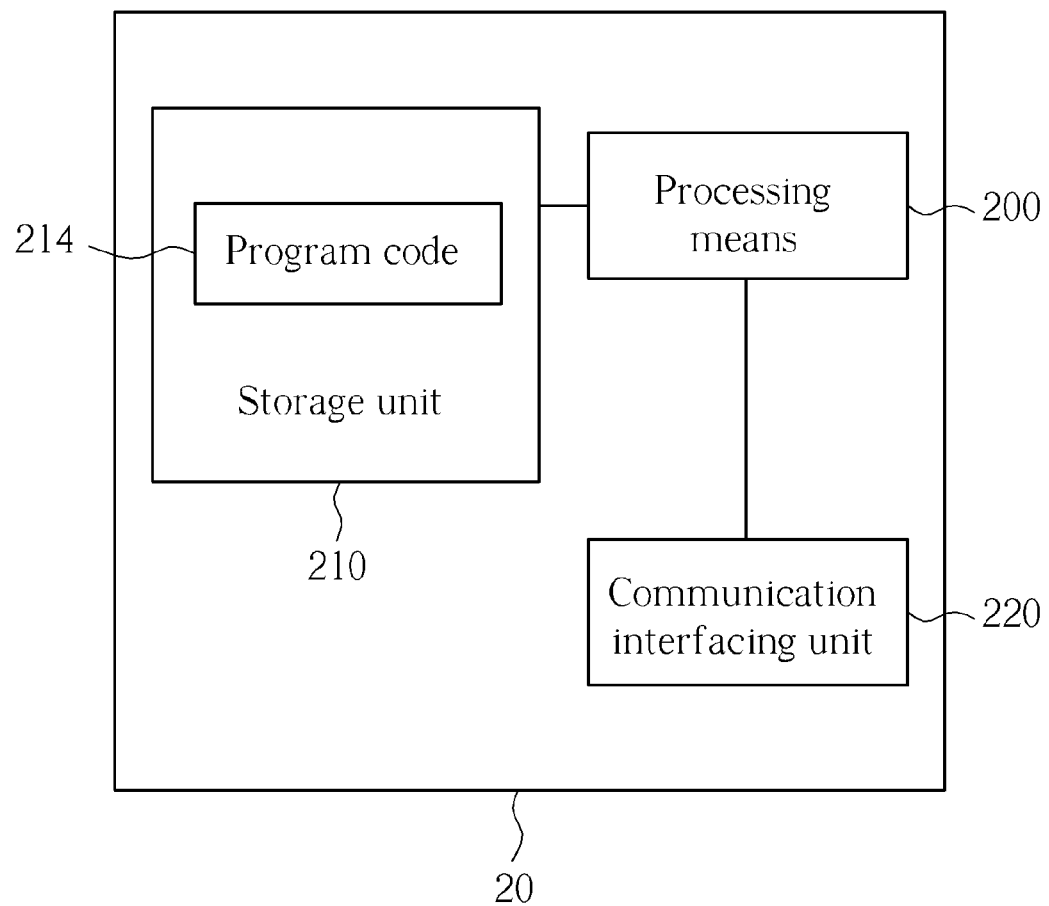
FIG. 3 illustrates a schematic diagram of an exemplary communication device.

FIG. 3 illustrates a schematic diagram of an exemplary communication device 20. The communication device 20 can be the mobile device 10 shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is preferably a radio transceiver and can exchange wireless signals with the network according to processing results of the processing means 200.

Figure 4:
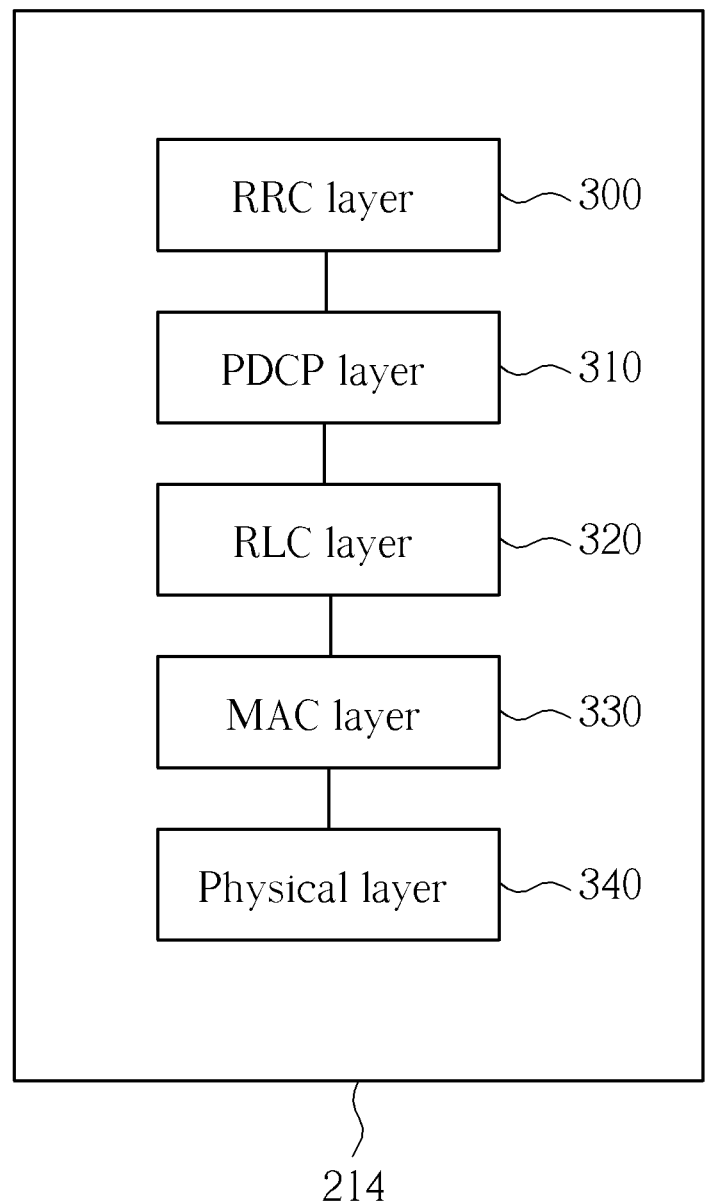
FIG. 4 illustrates a schematic diagram of communication protocol layers for an exemplary communication system.

Please refer to FIG. 4, which illustrates a schematic diagram of communication protocol layers for the LTE system. The behaviors of some of the protocol layers may be defined in the program code 214 and executed by the processing means 200. The protocol layers from top to bottom are a radio resource control (RRC) layer 300, a packet data convergence protocol (PDCP) layer 310, a radio link control (RLC) layer 320, a medium access control (MAC) layer 330 and a physical (PHY) layer 340.

Figure 5:
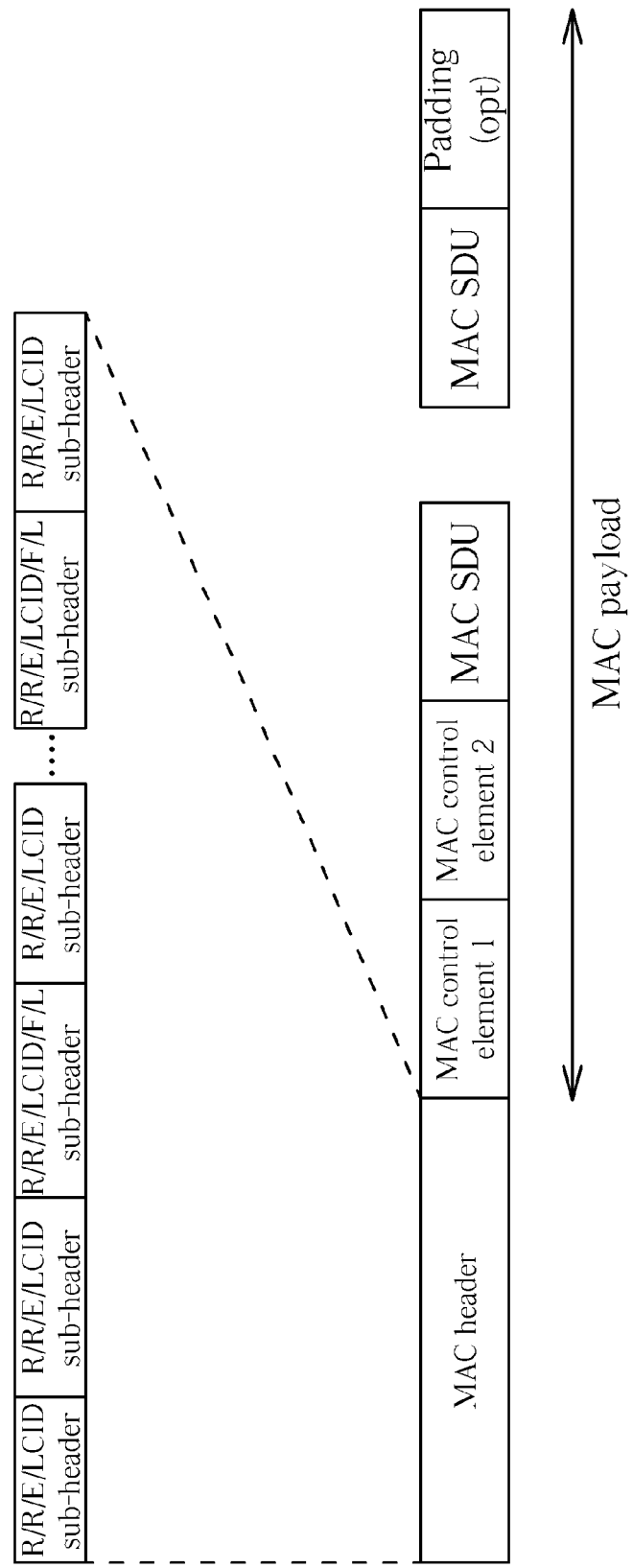
FIG. 5 illustrates a schematic diagram of a formation of a MAC PDU.

The MAC layer 330 may generates a MAC PDU (Protocol Data Unit) for buffer status reporting (BSR). Please refer to FIG. 5, which illustrates a schematic diagram of a formation of a MAC PDU. The MAC PDU includes at least a MAC subheader and at least a BSR MAC control element for indicating a buffer size of a logical channel group in the UE. Note that, Even though multiple events trigger the BSR procedure, the MAC PDU may not need to send multiple reports with the same status or size. Moreover, when the buffer status report is included in the MAC PDU for transmission, all triggered BSR may be cancelled. In addition, if an uplink grant is not configured to the UE, the UE may request for the uplink resource via scheduling request (SR) procedure for MAC PDU transmission. Note that, in some cases, the UE may not report the buffer status report if the uplink grant could accommodate all pending data available for transmission. After the UE sends the MAC PDU including the buffer status report to the network (i.e. an eNB), the eNB may determine to add/remove a (uplink) component carrier, activate/deactivate a (uplink) component carrier, perform handover procedure due to heavy loading, and/or perform primary component carrier (PCC) change procedure for load balance.

Figure 6:
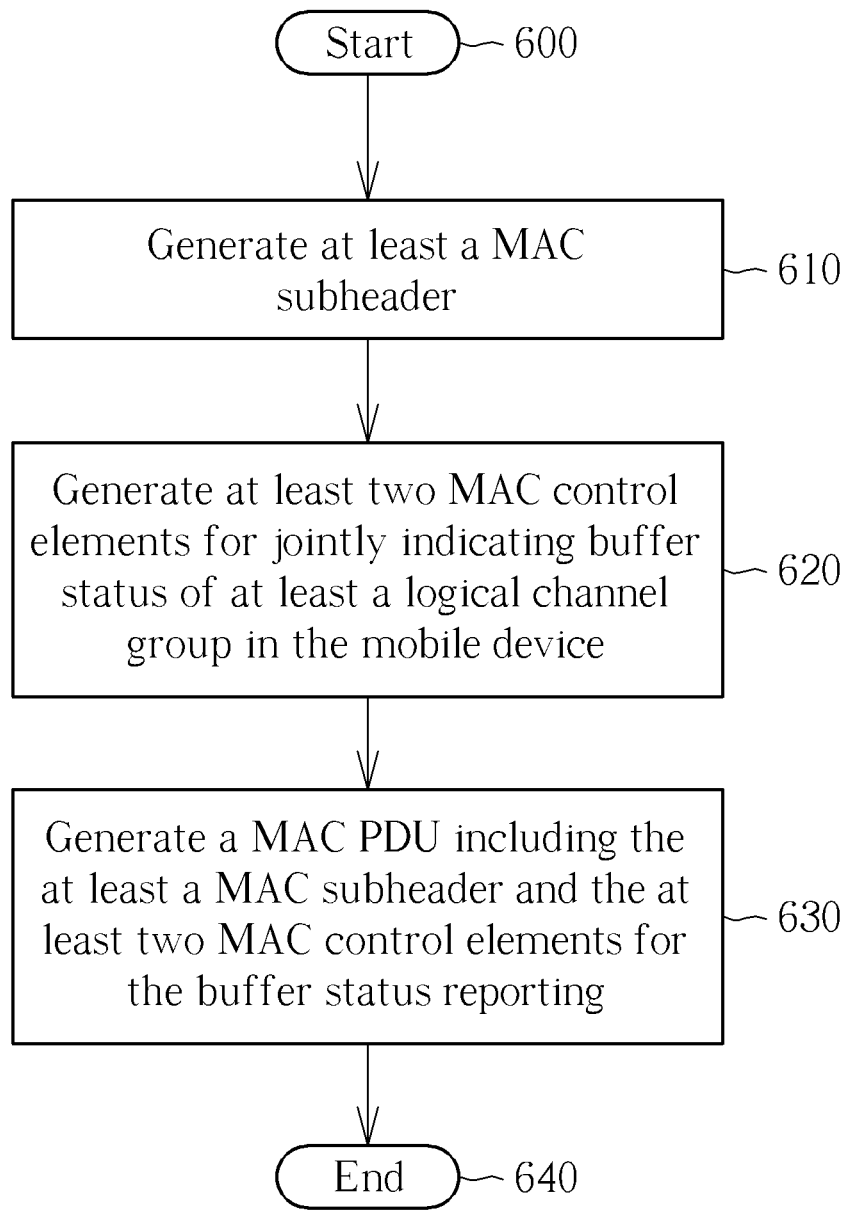
FIG. 6 is a flowchart of an exemplary process.

Please refer to FIG. 6, which illustrates a flowchart of an exemplary process 60. The process 60 is utilized in a UE (as the mobile device 10 of FIG. 2) capable of UL MIMO and/or capable of communicating with the network through a plurality of component carriers, for performing buffer status reporting. The process 60 can be compiled into the program code 214 and includes the following steps:

Step 600: Start.

Step 610: Generate at least a MAC subheader.

Step 620: Generate at least two MAC control elements for jointly indicating buffer status of at least a logical channel group in the mobile device.

Step 630: Generate a MAC PDU including the at least a MAC subheader and the at least two MAC control elements for the buffer status reporting.

Step 640: End.

According to the process 60, the UE generates one MAC subheader corresponding to at least two MAC control elements for jointly indicating buffer status of the logical channel group(s), or generates at least two MAC subheader corresponding to the at least two MAC control elements for jointly indicating buffer status of the logical channel group(s). In a word, the UE utilizes two or more MAC control elements for indicating the buffer size of the logical channel group(s), so as to increase the buffer size indication range.

Take an example based on the process 60. Referring back to FIG. 2, the UE is configured a number of "m" component carriers, and thereby the size of data that is buffered in a logical channel group for transmitting on the "m" component carriers may not be accurately indicated by the conventional 6-bit buffer size table. The detailed description can be referred from above, so it is not given herein. In this situation, the UE uses at least two MAC control elements for jointly indicating the buffer size of at least a logical channel group. Compared to the prior art, the UE used only one MAC control element to indicate buffer size of at least a logical channel group, which may cause insufficient resource allocation.

Figure 7:
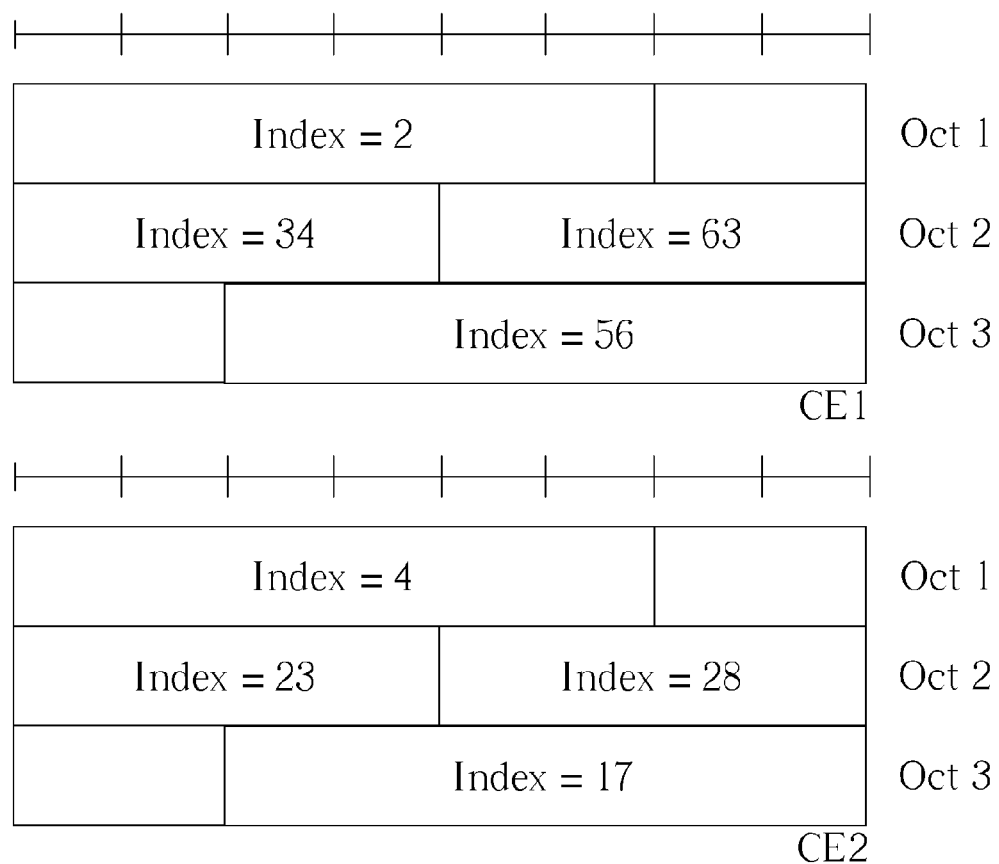
FIG. 7-FIG. 9 illustrate schematic diagrams of multiple MAC control elements for buffer size indication.

Please refer to FIG. 7, which illustrates a schematic diagram of multiple MAC control elements for buffer size indication. In FIG. 7, two long BSR MAC control elements with 6-bit index field are applied to indicate buffer status of logical channel groups LCG0-LCG3. The index='2' and index='4', index='34' and index='23', index='63' and index='28', and index='56' and index='17' are paired for buffer size indication. For example, the index='63' and index='28' correspond to BS>150000 and 603<BS<=706. For indicating a buffer status of the logical channel group LCG2, the buffer size values corresponding to the index='63' and index='28' are added to form a new buffer size range 150000+603<BS<=150000+706 (150603<BS<=150706). Thus, a sufficient resource can be allocated by the network since accurate buffer size range is known.

Figure 8:
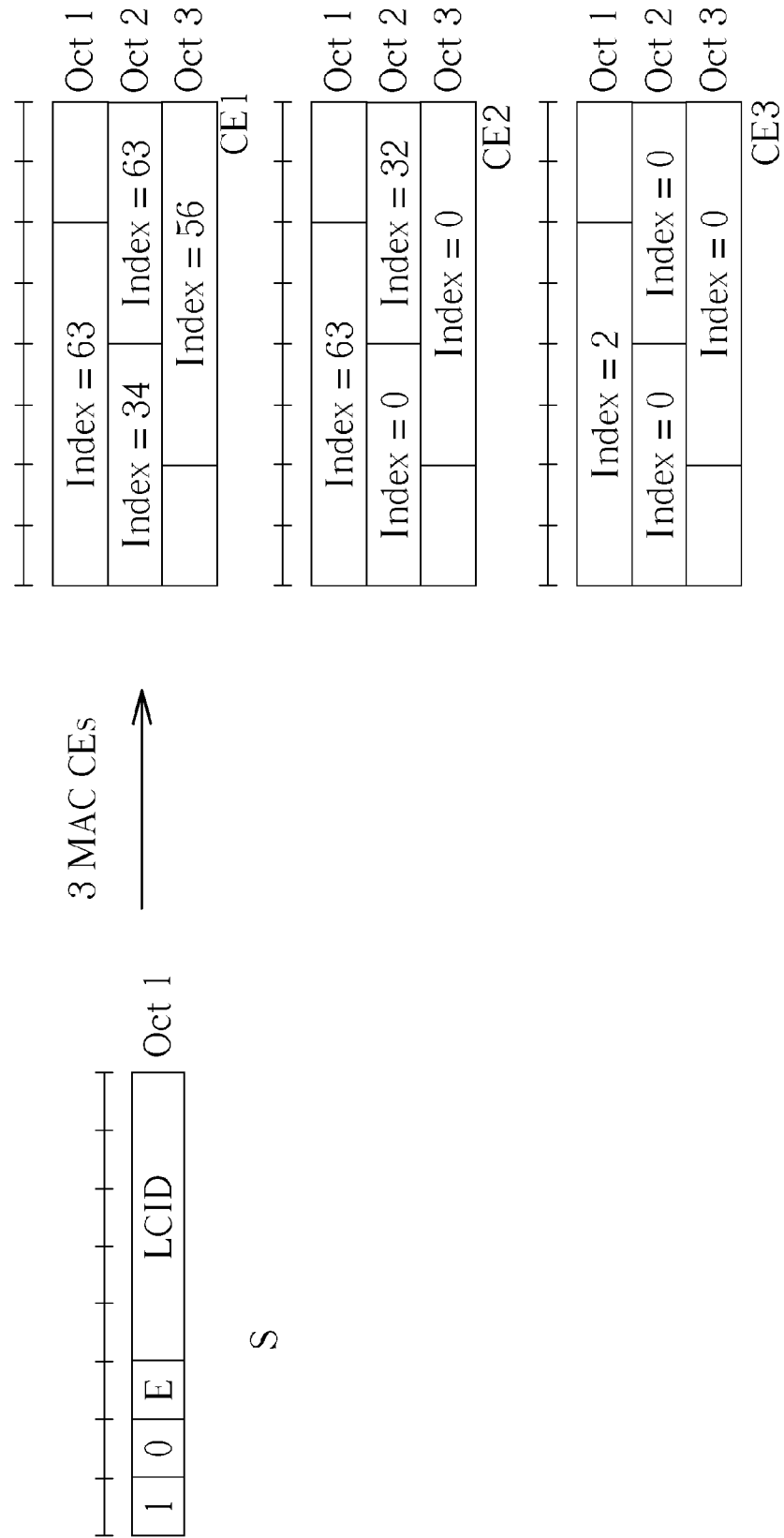

In FIG. 8, three long BSR MAC control elements CE1-CE3 are applied to indicate buffer status of glacial channel groups LCG0-LCG3, and correspond to one MAC subheader. A buffer size of the logical channel group LCG0 is indicated by index='63' in MAC control element CE1, index='63' MAC control element CE2, and index='2' in MAC control element CE3. The buffer size range is 150000+150000+10<BS<=150000+150000+12. The concept can be referred from above, so the detailed is omitted herein. Note that, the MAC subheader includes information of a number of the corresponding BSR MAC control element, and thereby the network knows how many BSR MAC control elements are used for jointly indicating the buffer status of the logical channel groups. In order to realize this, two R-bits in MAC subheader is used for indicating the number of the BSR MAC control element. For example, the '00' represents one MAC control element, '01' represents two MAC control elements, '10' represents three MAC control elements, and '11' represents four MAC control elements. Moreover, LCID value and two R bits are combined to indicate the number of the MAC control elements. For example, one LCID (e.g. 00001) for one, two, three and four MAC control elements, and another LCID (e.g. 10000) for one, two, four and eight MAC control elements.

Figure 9:
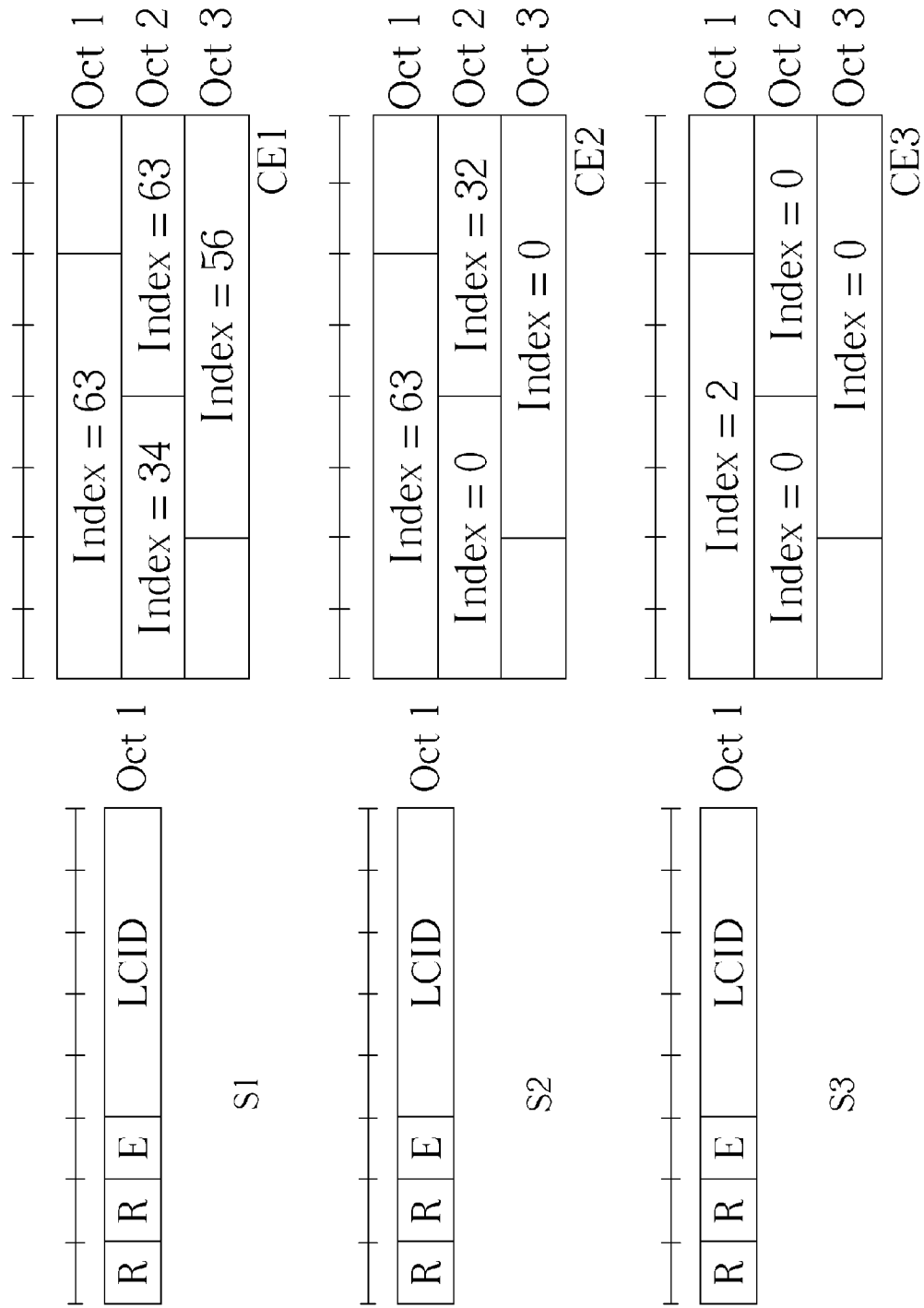

On the other hand, in FIG. 9, each BSR MAC control element corresponds to a MAC subheader. That is, the number of the MAC subheader is the same as the number of the BSR MAC control element. Note that, the three MAC subheaders may have the same LCID, so the network knows that the corresponding BSR MAC control elements are used for jointly indicating the buffer status of the logical channel groups. For example, a buffer size of the logical channel group LCG2 is indicated according to buffer size value indicated by index='63' in MAC control element CE1, index='32' in MAC control element CE2, and index='0' in MAC control element CE3. The buffer size range is 150000+1132+0<BS<=150000+1326+0. The concept can be referred from above, so the detailed description is not given herein.

Besides, the MAC subheader and/or the corresponding MAC control element(s) may further include at least one of the following information:

1. Logical channel group identity (LCG ID), for identifying the logical channel group(s) whose buffer status is reported.
2. Buffer size table indication, for indicating the used buffer size table. For example, two or more buffer size tables may be used by the UE for buffer status report, and the two R-bits may be set to '00', '01', '10', '11' for representing 4 types of buffer size table.
3. Component carrier configuration, for adding/removing, or activate/deactivate a component carrier. For example, an indicator may be used to indicate whether the buffer status for at least one LCG exceeds a pre-defined threshold, and/or to indicate whether the sum of buffer status for at least one LCG exceeds a pre-defined threshold. Thus, the network may determine whether to add/remove or activate/deactivate a component carrier based on the indicator.
4. Length field, for indicating length or bytes of the corresponding MAC control elements.
5. Logical channel identity (LCID), for indicating a format of the corresponding MAC control element (e.g. long or short MAC control element).
6. Number of MAC control elements, for indicating a number of the corresponding BSR MAC control elements used jointly to report the buffer status of the logical channel group(s).

Figure 10:
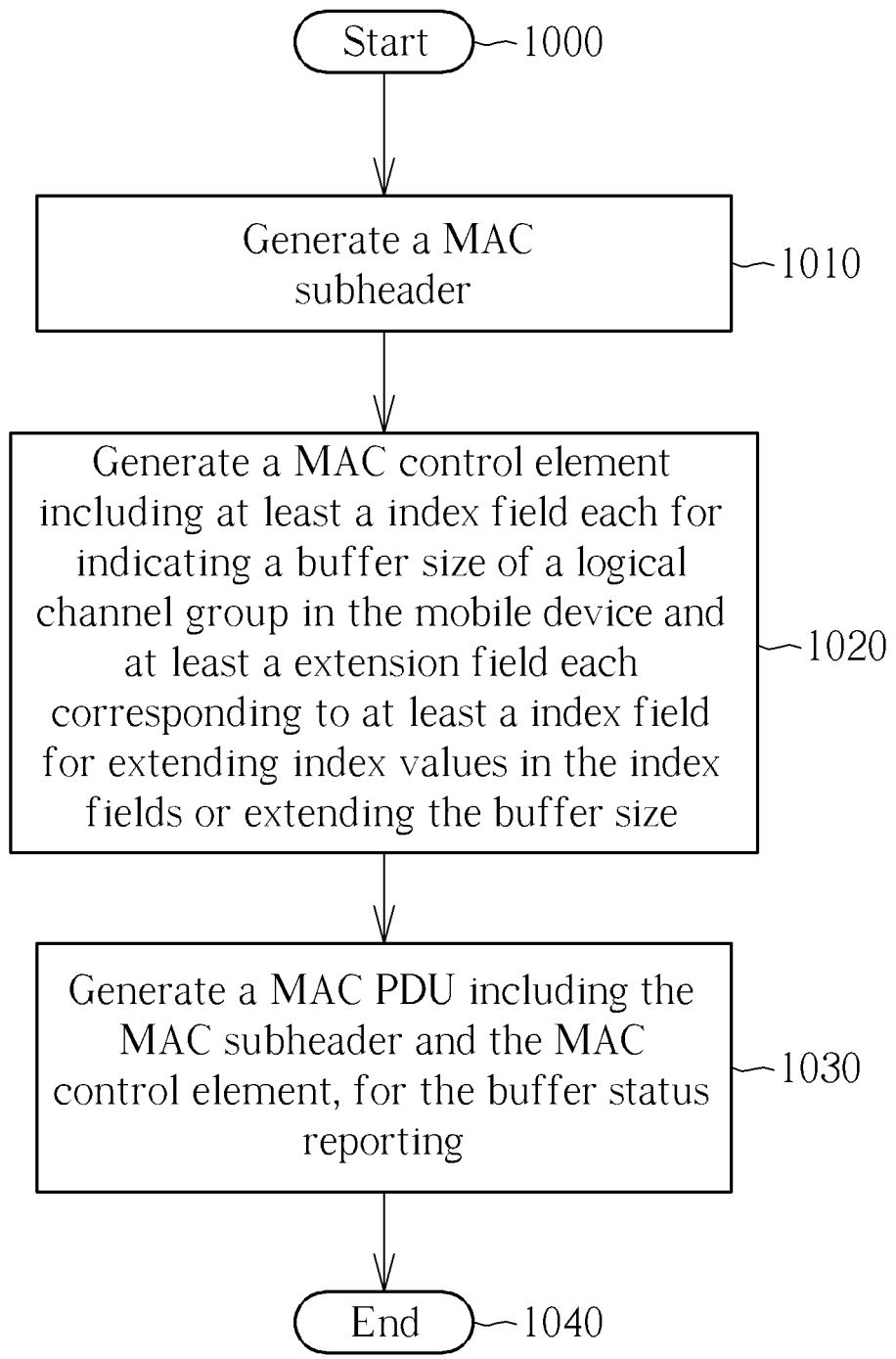
FIG. 10 is a flowchart of an exemplary process.

Please refer to FIG. 10, which illustrates a flowchart of an exemplary process 100. The process 100 is utilized in a UE (as the mobile device 10 of FIG. 2) capable of UL MIMO and/or capable of communicating with the network through a plurality of component carriers, for performing buffer status reporting. The process 100 can be compiled into the program code 214 and includes the following steps:

Step 1000: Start.
Step 1010: Generate a MAC subheader.
Step 1020: Generate a MAC control element including at least a index field each for indicating a buffer size of a logical channel group in the mobile device and at least a extension field each corresponding to at least a index field for extending index values in the index fields or extending the buffer size.
Step 1030: Generate a MAC PDU including the MAC subheader and the MAC control element, for the buffer status reporting.
Step 1040: End.

According to the process 100, at least a extension field corresponding to the at least a index field is included in the MAC control element for extending buffer size indication range and index value range, so as to accurately indicate the buffer size of the logical channel group to the network. In a word, the MAC control element size is extended (e.g. adding one or two bytes in the end of the MAC control element) for extending buffer size indication range and index value.

Figure 11:
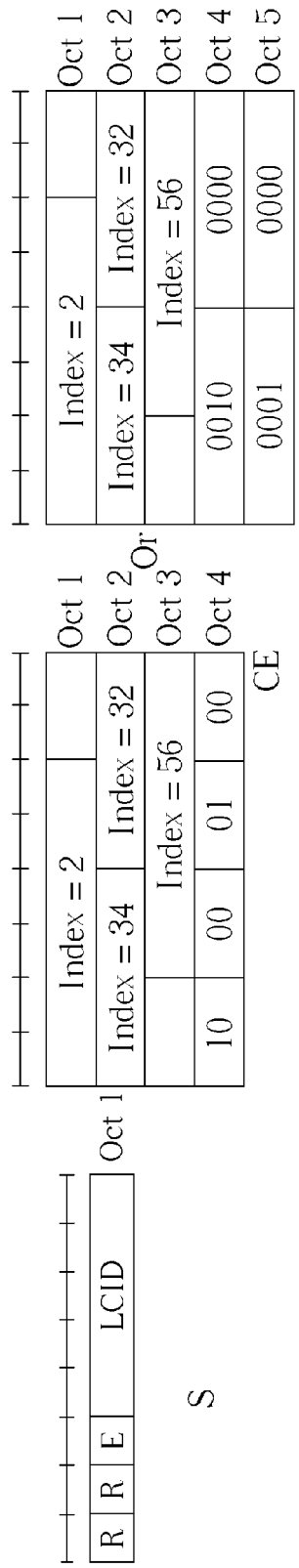
FIG. 11 illustrates a schematic diagram of a MAC control element for buffer size indication.

Please refer to FIG. 11, which illustrates a schematic diagram of a MAC control element for buffer size indication. In an embodiment, the conventional 6-bit buffer size table in FIG. 1 is used. Assume the extension field is 2 bits, and is used for indicating the number of the maximum buffer size value (e.g. 150000 bytes) is added per buffer. For example, suppose '00' in MAC control element CE represents 0, '01' represents 1, '10' represents 2, and '11' represents 3. Thus, the buffer size of the logical channel group LCG0 is that the maximum buffer size value added twice pluses a buffer size value corresponding to the index='2'. That is, the buffer size range is 150000+150000+10<BS<=150000+150000+12. On the other hand, the extension field may be 4 bits for indicating the number of the maximum buffer size value is added per buffer. For example, suppose '0000' represents 0, '0001' represents 1, '0010' represents 2, and so on. The operation of buffer size range extension can be referred from above, so it is omitted herein.

Note that, the MAC subheader and/or the corresponding MAC control element(s) may include at least one of the following information:

1. Logical channel group identity (LCG ID), for identifying the logical channel group(s) whose buffer status is reported.
2. Buffer size table indication, for indicating the used buffer size table.
3. Component carrier configuration, for adding/removing, or activate/deactivate a component carrier. For example, an indicator may be used to indicate whether the buffer status for at least one LCG exceeds a pre-defined threshold, and/or to indicate whether the sum of buffer status for at least one LCG exceeds a pre-defined threshold. Thus, the network may determine whether to add/remove or activate/deactivate a component carrier based on the indicator.
4. Length field, for indicating length or bytes of the corresponding MAC control elements.
5. Logical channel identity (LCID), for indicating a format of the corresponding MAC control element (e.g. long, short, and/or extended MAC control element).
6. Number of MAC control elements, for indicating a number of the corresponding BSR MAC control elements used jointly to report the buffer status of the logical channel group(s).

Figure 12:
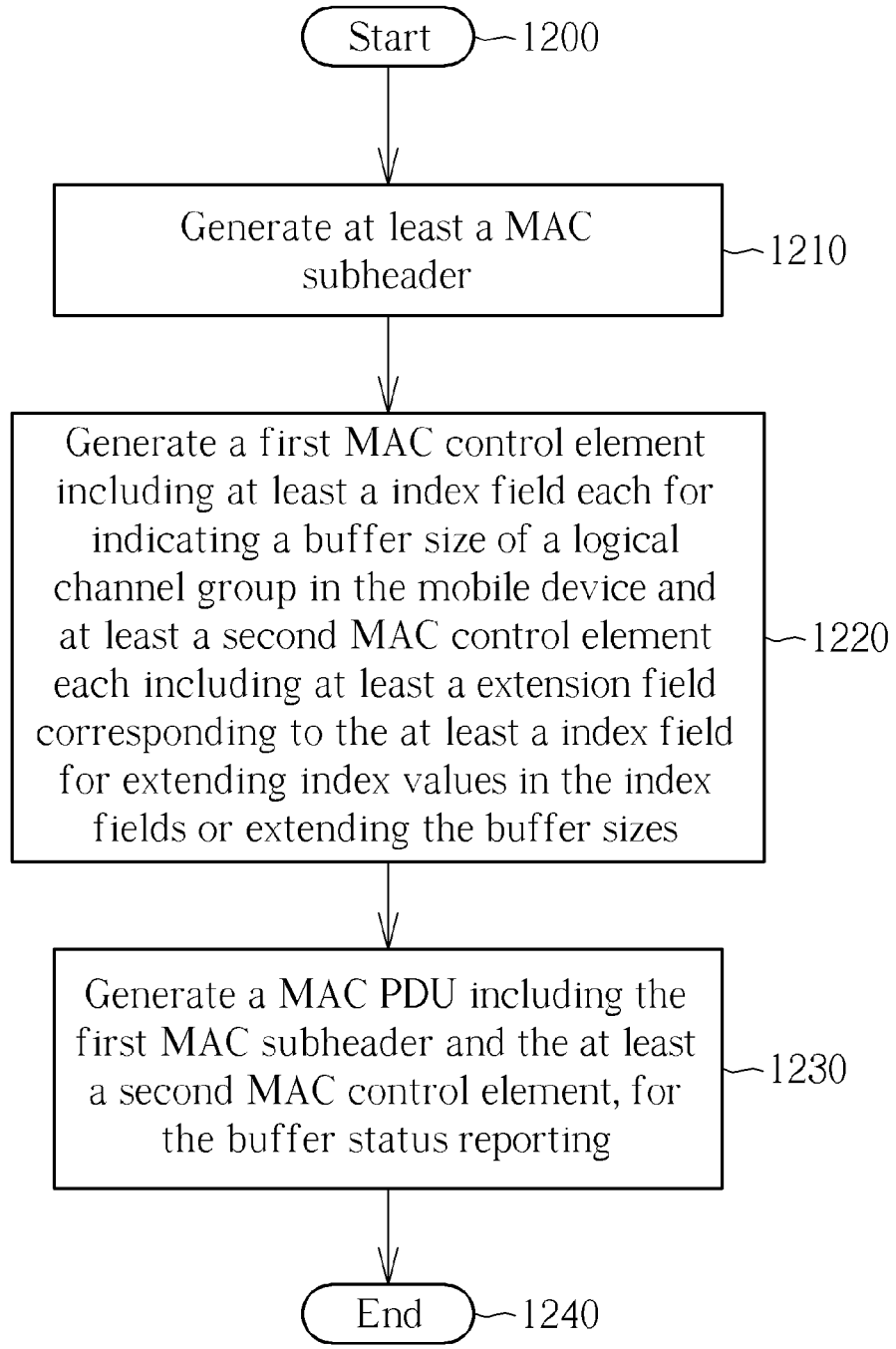
FIG. 12 is a flowchart of an exemplary process.

Please refer to FIG. 12, which illustrates a flowchart of an exemplary process 120. The process 120 is utilized in a UE (as the mobile device 10 of FIG. 2) capable of capable of UL MIMO and/or communicating with the network through a plurality of component carriers, for performing buffer status reporting. The process 120 can be compiled into the program code 214 and includes the following steps:

Step 1200: Start.
Step 1210: Generate at least a MAC subheader.
Step 1220: Generate a first MAC control element including at least a index field each for indicating a buffer size of a logical channel group in the mobile device and at least a second MAC control element each including at least a extension field corresponding to the at least a index field for extending index values in the index fields or extending the buffer sizes.
Step 1230: Generate a MAC PDU including the first MAC subheader and the at least a second MAC control element, for the buffer status reporting.
Step 1240: End.

According to the process 120, at least a MAC control element including extension fields is used for extending buffer size indication range or index value range, so as to accurately indicate the buffer size of the logical channel group to the network. In a word, an extension MAC control element including no index field but extension fields is introduced for extending buffer size indication range or index value.

Figure 13:
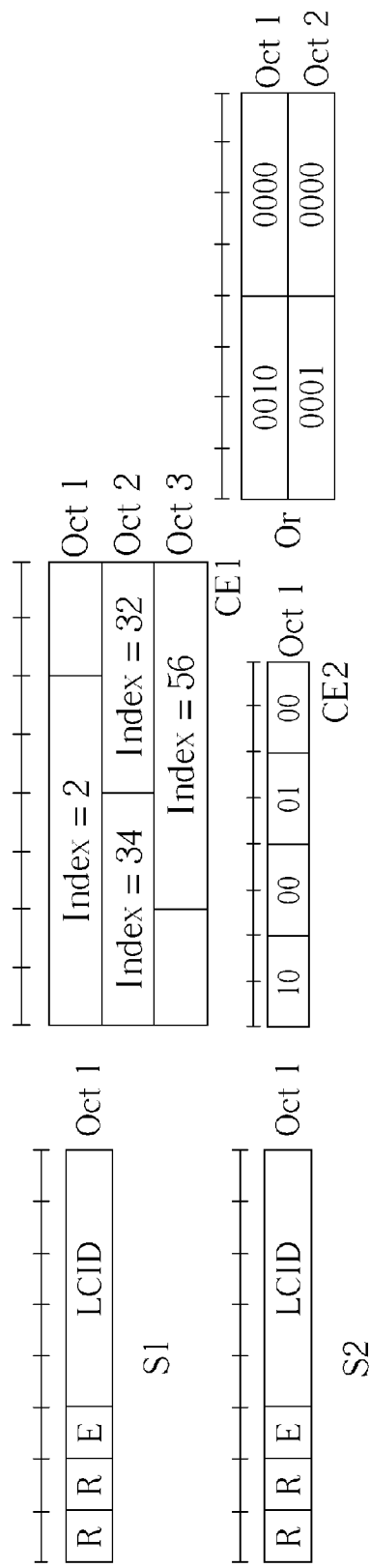
FIG. 13-FIG. 15 illustrate schematic diagrams of multiple MAC control elements for buffer size indication.

Please refer to FIG. 13, which illustrates a schematic diagram of a MAC control element for buffer size indication. In an embodiment, the conventional 6-bit buffer size table in FIG. 1 is used. Assume the extension field in MAC control element CE2 is 2 bits, and is used for indicating the number of the maximum buffer size value (e.g. 150000 bytes) is added per buffer. Suppose '00' represents 0, '01' represents 1, '10' represents 2, and '11' represents 3. Thus, the buffer size of the logical channel group LCG0 is that the maximum buffer size value added twice pluses a buffer size value corresponding to the index='2' in MAC control element CE1. That is, the buffer size range is 150000+150000+10<BS<=150000+150000+12. On the other hand, the extension field may be 4 bits for indicating the number of the maximum buffer size value is added per buffer. Suppose '0000' represents 0, '0001' represents 1, '0010' represents 2, and so on. The operation of buffer size range extension can be referred from above, so it is omitted herein.

Note that, the MAC control elements CE1-CE2 correspond to MAC subheaders S1-S2 respectively, and these two MAC subheaders S1-S2 may use different LCID for indicating a format of the MAC control element CE1-CE2 (e.g. long, short, and/or extended MAC control element). For example, a first LCID in the MAC subheader S1 indicates that the MAC control element CE1 is a long format MAC control element, and a second LCID in the MAC subheader S2 indicates that the MAC control element CE2 is the extension MAC control element.

Figure 14:
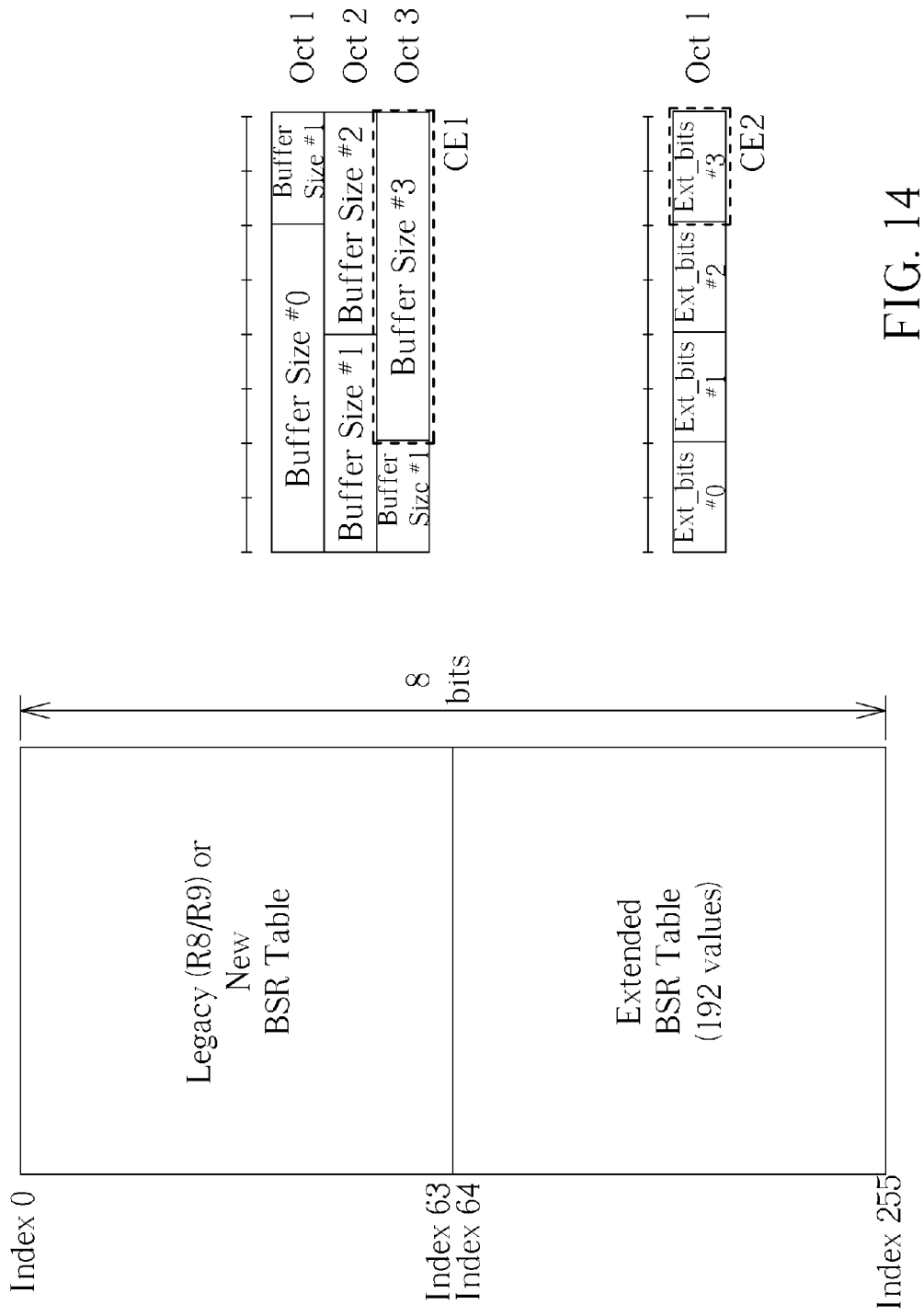

For index value extension, please refer to FIG. 14. In this embodiment, an extended 8-bit buffer size table is used. The extended buffer size table includes index value from 0 to 255 (i.e. index='0'-'255'). Assume the extension field (shown as Ext_bits#0-Ext_bits#3) in MAC control element CE2 is 2 bits, which is represent as '00', '01', '10', and '11'. The 2 bits of the extension field is jointly encoding with the 6 bits of the index field (shown as Buffer Size#0-Buffer Size#3) for extending the index value in the index field. For example, adding the 2 bits of the extension field in the most significant bits or the least significant bits of the index field, so as to extend the index value range. Thus, each of the index='0'-'255' can be indicated by the MAC control elements CE1-CE2.

Figure 15:
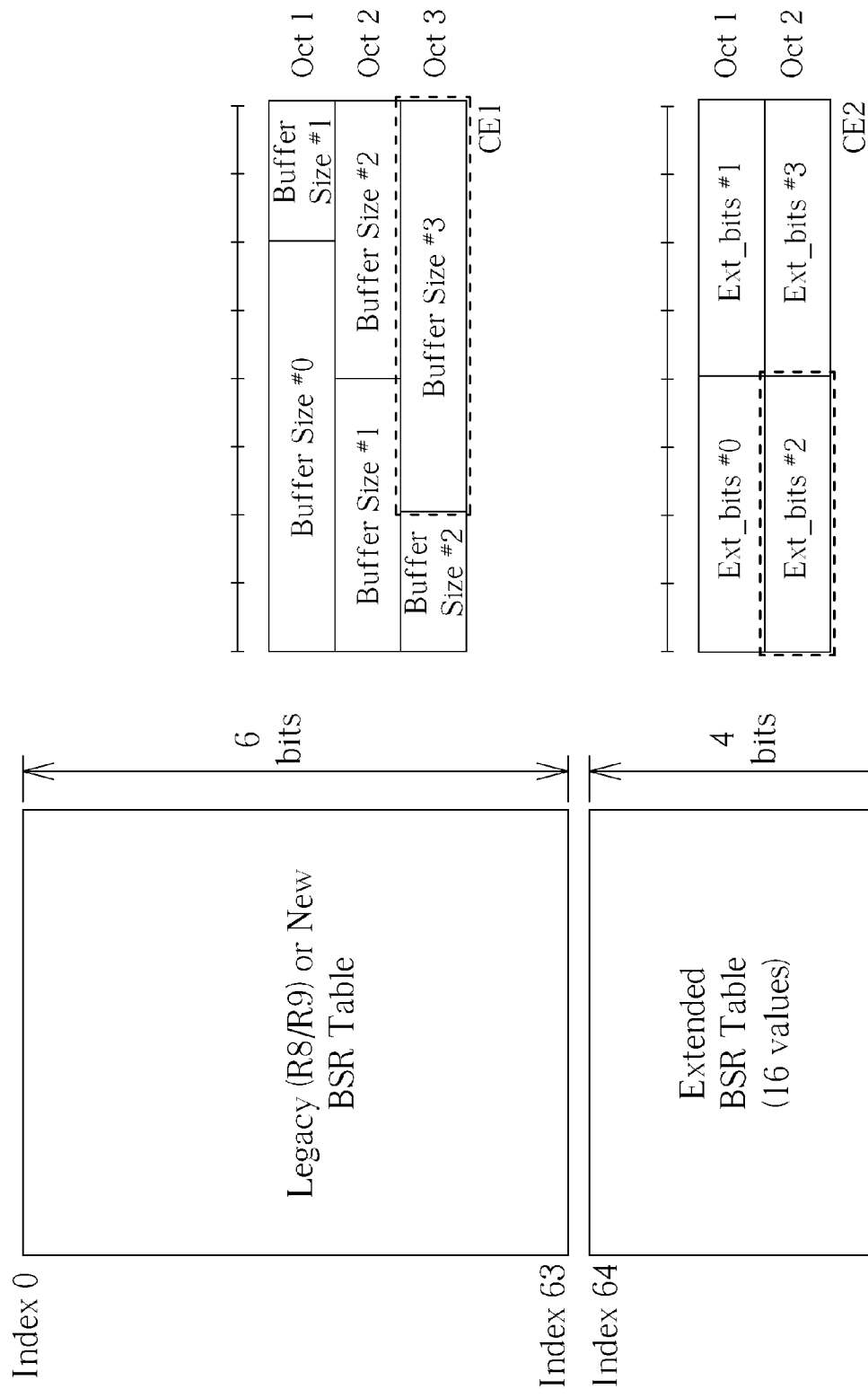

In another embodiment, more than one buffer size table can be used. As illustrated in FIG. 15, one buffer size table is the conventional 6-bit buffer size table, and the other is 4-bit extended buffer size table. The extension field (shown as Ext_bits#0-Ext_bits#3) in MAC control element CE2 is 4 bits, thereby representing a number of 16 index values in the extended buffer size table. The network knows that the index field in MAC control element CE1 and the extension field in MAC control element CE2 are used for jointly indicating the buffer status of the logical channel group. The concept can be referred from above, so the detailed description is not given herein.

On the other hand, more than one extension MAC control elements CE1-CE3 is applied. Assume the extension field in MAC control element CE2-CE3 is 2 bits, thereby each representing a number of 4 index values in the extended buffer size table. Thus, network knows that the corresponding BSR MAC control elements and extension MAC control elements are used for jointly indicating the buffer status of the logical channel group(s).

Note that, the extension MAC control element(s) and the common MAC control element may correspond to a MAC subheader or each to a MAC subheader. In addition, the MAC subheader and/or the corresponding MAC control element(s) may include at least one of the following information:
  1. Logical channel group identity (LCG ID), for identifying the logical channel group(s) whose buffer status is reported.
  2. Buffer size table indication, for indicating the used buffer size table (e.g. the 6-bit, 8-bit, or 10-bit buffer size table).
  3. Component carrier configuration, for adding/removing, or activate/deactivate a component carrier. For example, an indicator may be used to indicate whether the buffer status for at least one LCG exceeds a pre-defined threshold, and/or to indicate whether the sum of buffer status for at least one LCG exceeds a pre-defined threshold. Thus, the network may determine whether to add/remove or activate/deactivate a component carrier based on the indicator.
  4. Length field, for indicating length or bytes of the corresponding MAC control elements.
  5. Logical channel identity (LCID), for indicating a format of the corresponding MAC control element (e.g. long, short, and/or extension MAC control element).
  6. Number of MAC control elements, for indicating a number of the corresponding BSR MAC control elements used jointly to report the buffer status of the logical channel group(s).

In conclusion, the present invention provides methods and apparatus for performing buffer status reporting, so as to accurately report the amount of data available for transmission to the network, thereby obtaining sufficient resource for transmission.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of performing buffer status reporting for a mobile device capable of uplink multiple-input multiple-output (MIMO) and/or capable of receiving and transmitting on a plurality of component carriers in a wireless communication system, the method comprising:
  generating at least a medium access control (MAC) subheader;
  generating at least two MAC control elements for jointly indicating buffer status of at least a logical channel group in the mobile device; and
  generating a MAC protocol data unit (PDU) including the at least a MAC subheader and the at least two MAC control elements for the buffer status reporting;
  wherein one of the at least two MAC control elements is in a short format for which buffer status of one logical channel group is reported, or in a long format for which buffer status of all logical channel groups are reported;
  wherein the at least a MAC subheader and/or one of the at least two MAC control elements includes information of at least one of a logical channel identity for indicating the format of one of the at least two MAC control elements, a logical channel group identity for indicating the buffer status of which logical channel group is reported, a buffer size table indication associated to a buffer size table used in the buffer status report, a component carrier configuration for adding/removing, or activating/deactivating a component carrier of the plurality of component carriers, a number of the at least two MAC control elements for the buffer status reporting, and a length of one of the at least two MAC control elements.

2. The method of claim 1, wherein one of the at least two MAC control elements includes information of at least an index field in a buffer 20 size table in the mobile device for indicating the at least a buffer size of the at least a logical channel group.

3. The method of claim 2, wherein generating at least two MAC control elements for jointly indicating the buffer status of the at least a logical channel group in the mobile device comprises:
  generating the at least two MAC control elements for jointly indicating the buffer status of the at least a logical channel group in the mobile device via adding the at least a buffer size indicated by the at least an index field in the buffer size table.

4. A method of performing buffer status reporting for a mobile device capable of uplink multiple-input multiple-output (MIMO) and/or capable of receiving and transmitting on a plurality of component carriers in a wireless communication system, the method comprising:
    generating a medium access control (MAC) subheader;
    generating a MAC control element including at least an index field each for indicating a buffer size of a logical channel group in the mobile device and at least an extension field each corresponding to at least an index field for extending index values in the index fields or extending the buffer size; and
    generating a MAC protocol data unit (PDU) including the MAC subheader and the MAC control element, for the buffer status reporting:,
    wherein the MAC control element is in a short format for which one buffer status of one logical channel group is reported, or in a long format for which buffer status of all logical channel groups are reported;
    wherein the MAC subheader and/or MAC control element includes information of at least one of a logical channel identity for indicating the format of the MAC control element, a logical channel group identity for indicating the buffer status of which logical channel group is reported, a buffer size table indication associated to a buffer size table used in the buffer status report, a component carrier configuration for adding/removing, or activating/deactivating a component carrier of the plurality of component carriers, a length of the corresponding MAC control element, a number of the MAC control elements for the buffer status reporting.

5. The method of claim 4, wherein generating the MAC control element including the at least an index field each for indicating the buffer size of the logical channel group in the mobile device and the at least an extension field each corresponding to at least an index field for extending index values in the index fields or extending the buffer size comprises:
    generating the MAC control element including the at least an index field and the at least an extension field each corresponding to at least an index field for extending index values in the index fields or extending the buffer size via adding a number indicated in the extension field with the buffer size indicated in the index field.

6. A method of performing buffer status reporting for a mobile device capable of uplink multiple-input multiple-output (MIMO) and/or capable of receiving and transmitting on a plurality of component carriers in a wireless communication system, the method comprising:
    generating at least a medium access control (MAC) subheader;
    generating a first MAC control element including at least an index field each for indicating a buffer size of a logical channel group in the mobile device and at least a second MAC control element each including at least an extension field corresponding to the at least an index field for extending index values in the index fields or extending the buffer sizes; and
    generating a MAC protocol data unit (PDU) including the at least a MAC subheader, the first MAC control element and the at least a second MAC control element, for the buffer status reporting;
    wherein the first MAC control element is in a short format for which one buffer status of one logical channel group is reported, or in a long format for which buffer status of all logical channel groups are reported;
    wherein the at least a MAC subheader, the first MAC control element and/or the at least a second MAC control element includes information of at least one of a logical channel identity for indicating the format of the first MAC control element, a logical channel group identity for indicating the buffer status of which logical channel group is reported, a buffer size table indication associated to a buffer size table used in the buffer status report, a component carrier configuration for adding/removing, or activating/deactivating a component carrier of the plurality of component carriers, a length of the first MAC control element, a length of the at least a second MAC control element, and a number of the at least a second MAC control elements for the buffer status reporting.

7. The method of claim 6, wherein generating the first MAC control element including the at least an index field each for indicating the buffer size of the logical channel group in the mobile device and the at least a second MAC control element each including the at least an extension field corresponding to the at least an index field for extending index values in the index fields or extending the buffer sizes comprises:
    generating the first MAC control element and the at least a second MAC control element for extending the index values in the index fields via adding bits of the extension field in the most significant bits or the least significant bits of the index field;
    generating the first MAC control element and the at least a second MAC control element for extending the index values in the index fields via adding index values indicated by the extension fields of the second MAC control element with the index values in the index fields of the first MAC control element; or
    generating the first MAC control element and the at least a second MAC control element for extending the index values in the index fields via adding buffer size values indicated by the extension fields of the second MAC control element with the buffer size values indicated by the index fields of the first MAC control element.

8. A communication device of a wireless communication system for performing buffer status reporting, the communication device capable of uplink multiple-input multiple-output (MIMO) and/or capable of receiving and/or transmitting on a plurality of component carriers and comprising:
    a storage device for storing program code corresponding to a process; and
    a processor coupled to the storage device, for processing the program code to execute the process;
    wherein the process comprises:
    generating at least a medium access control (MAC) subheader;
    generating at least two MAC control elements for jointly indicating buffer status of at least a logical channel group in the mobile device; and
    generating a MAC protocol data unit (PDU) including the at least a MAC subheader and the at least two MAC control elements for the buffer status reporting;
    wherein one of the at least two MAC control elements is in a short format for which buffer status of one logical channel group is reported, or in a long format for which buffer status of all logical channel groups are reported;
    wherein the at least a MAC subheader and/or one of the at least two MAC control elements includes information of at least one of a logical channel identity for indicating the format of one of the at least two MAC control elements, a logical channel group identity for indicating the buffer status of which logical channel group is reported, a buffer size table indication associated to a buffer size table used in the buffer status report, a component carrier configuration for adding/removing, or activating/deactivating a component carrier of the plurality of component carriers, a number of the at least two MAC control elements for the buffer status reporting, and a length of one of the at least two MAC control elements.

9. The communication device of claim 8, wherein one of the at least two MAC control elements includes information of at least an index field in the buffer size table in the mobile device for indicating the at least a buffer size of the at least a logical channel group.

10. The communication device of claim 9, wherein the process further comprises:
generating the at least two MAC control elements for jointly indicating the buffer status of the at least a logical channel group in the mobile device via adding the at least a buffer size indicated by the at least an index field in the buffer size table.

11. A communication device of a wireless communication system for performing buffer status reporting, the communication device capable of uplink multiple-input multiple-output (MIMO) and/or capable of receiving and/or transmitting on a plurality of component carriers and comprising:
a storage device for storing program code corresponding to a process; and
a processor coupled to the storage device, for processing the program code to execute the process;
wherein the process comprises:
generating a medium access control (MAC) subheader;
generating a MAC control element including at least an index field each for indicating a buffer size of a logical channel group in the mobile device and at least an extension field each corresponding to at least an index field for extending index values in the index fields or extending the buffer size; and
generating a MAC protocol data unit (PDU) including the MAC subheader and the MAC control element, for the buffer status reporting;
wherein the MAC control element is in a short format for which one buffer status of one logical channel group is reported, or in a long format for which buffer status of all logical channel groups are reported;
wherein the MAC subheader and/or MAC control element includes information of at least one of a logical channel identity for indicating the format of the MAC control element, a logical channel group identity for indicating the buffer status of which logical channel group is reported, a buffer size table indication associated to a buffer size table used in the buffer status report, a component carrier configuration for adding/removing, or activating/deactivating a component carrier of the plurality of component carriers, a length of the corresponding MAC control element, a number of the MAC control elements for the buffer status reporting.

12. The communication device of claim 11, wherein the process further comprises:
generating the MAC control element including the at least an index field and the at least an extension field each corresponding to at least an index field for extending index values in the index fields or extending the buffer size via adding a number indicated in the extension field with the buffer size indicated in the index field.

13. A communication device of a wireless communication system for performing buffer status reporting, the communication device capable of uplink multiple-input multiple-output (MIMO) and/or capable of receiving and/or transmitting on a plurality of component carriers and comprising:
a storage device for storing program code corresponding to a process; and
a processor coupled to the storage device, for processing the program code to execute the process;
wherein the process comprises:
generating at least a medium access control (MAC) subheader;
generating a first MAC control element including at least an index field each for indicating a buffer size of a logical channel group in the mobile device and at least a second MAC control element each including at least an extension field corresponding to the at least an index field for extending index values in the index fields or extending the buffer sizes; and
generating a MAC protocol data unit (PDU) including the at least a MAC subheader, the first MAC control element and the at least a second MAC control element, for the buffer status reporting
wherein the first MAC control element is in a short format for which one buffer status of one logical channel group is reported, or in a long format for which buffer status of all logical channel groups are reported;
wherein the at least a MAC subheader, the first MAC control element and/or the at least a second MAC control element includes information of at least one of a logical channel identity for indicating the format of the first MAC control element, a logical channel group identity for indicating the buffer status of which logical channel group is reported, a buffer size table indication associated to a buffer size table used in the buffer status report, a component carrier configuration for adding/removing, or activating/deactivating a component carrier of the plurality of component carriers, a length of the first MAC control element, a length of the at least a second MAC control element and a number of the at least a second MAC control elements for the buffer status reporting.

14. The communication device of claim 13, wherein the process further comprises:
generating the first MAC control element and the at least a second MAC control element for extending the index values in the index fields via adding bits of the extension field in the most significant bits or the least significant bits of the index field;
generating the first MAC control element and the at least a second MAC control element for extending the index values in the index fields via adding index values indicated by the extension fields of the second MAC control element with the index values in the index fields of the first MAC control element; or
generating the first MAC control element and the at least a second MAC control element for extending the index values in the index fields via adding buffer size values indicated by the extension fields of the second MAC control element with the buffer size values indicated by the index fields of the first MAC control element.

* * * * *